United States Patent
Cimberio et al.

(10) Patent No.: US 11,041,632 B2
(45) Date of Patent: Jun. 22, 2021

(54) THERMOSTATIC DEVICE AND SANITARY WATER SUPPLY AND/OR DISPENSING SYSTEM COMPRISING SUCH A THERMOSTATIC DEVICE

(71) Applicant: FIMCIM S.p.A., Milan (IT)

(72) Inventors: Roberto Cimberio, Ameno Fraz. Vacciago (IT); Tiziano Guidetti, Borgomanero (IT); Andrea Chiarello, Ghevio di Meina (IT)

(73) Assignee: FIMCIM S.p.A., Milan (IT)

( * ) Notice: Subject to any disclaimer, the term of this patent is extended or adjusted under 35 U.S.C. 154(b) by 0 days.

(21) Appl. No.: 16/401,550

(22) Filed: May 2, 2019

(65) Prior Publication Data

US 2019/0338961 A1 Nov. 7, 2019

(30) Foreign Application Priority Data

May 3, 2018 (IT) .................... 102018000005057

(51) Int. Cl.
*G05B 19/042* (2006.01)
*F24D 3/08* (2006.01)
(Continued)

(52) U.S. Cl.
CPC ........... *F24D 3/08* (2013.01); *F24D 19/1063* (2013.01); *G05B 19/042* (2013.01);
(Continued)

(58) Field of Classification Search
CPC ........ F24D 3/08; F24D 19/1063; F24D 17/00; F24D 17/0078; G05B 19/042;
(Continued)

(56) References Cited

U.S. PATENT DOCUMENTS

| | | | | |
|---|---|---|---|---|
| 5,414,879 A | * | 5/1995 | Hiraishi ............. | G05D 23/1393 4/601 |
| 2009/0314484 A1 | * | 12/2009 | Barrett ................. | G05D 23/192 165/293 |

(Continued)

FOREIGN PATENT DOCUMENTS

WO 2016/008001 1/2016

OTHER PUBLICATIONS

Search Report cited in IT 201800005057, completed Jan. 24, 2019, 12 pages.

*Primary Examiner* — Rocio Del Mar Perez-Velez
*Assistant Examiner* — Alicia M. Choi
(74) *Attorney, Agent, or Firm* — Nixon & Vanderhye P.C.

(57) ABSTRACT

A thermostatic device for a pipeline of a sanitary water supply or dispensing system and including a temperature meter which detects the temperature of the sanitary water entering the thermostatic device, a flow regulator which regulates a rate of sanitary water exiting from the device, and a control unit. The flow regulator operates in a first operating mode and a second operating mode. The first operating mode is a steady-state operating mode. The second operating mode is a steady-state setting operating mode in which the flow rate of sanitary water leaving the thermostatic device is a minimum flow rate. The control unit is configured to acquire, receive and/or calculate a reference temperature and arrange the switching of the operating mode when the temperature meter detects a temperature of the sanitary water greater than the reference temperature.

19 Claims, 5 Drawing Sheets

(51) Int. Cl.
*F24D 19/10* (2006.01)
*G05D 23/19* (2006.01)
*G05D 23/275* (2006.01)

(52) U.S. Cl.
CPC ..... *G05D 23/1921* (2013.01); *G05D 23/1927* (2013.01); *G05D 23/27543* (2013.01); *G05B 2219/25257* (2013.01)

(58) Field of Classification Search
CPC ..... G05B 2219/25257; G05D 23/1921; G05D 23/1927; G05D 23/27543; G05D 23/1346
USPC ........................................................ 700/282
See application file for complete search history.

(56) References Cited

U.S. PATENT DOCUMENTS

| | | | | |
|---|---|---|---|---|
| 2009/0322359 | A1* | 12/2009 | Rho | F16K 31/535 324/714 |
| 2010/0116223 | A1* | 5/2010 | Tsuji | F24D 19/1051 122/14.3 |
| 2010/0326372 | A1* | 12/2010 | Kim | F24H 9/2007 122/14.3 |
| 2015/0057816 | A1* | 2/2015 | Schick | G05D 7/0635 700/282 |
| 2017/0276406 | A1* | 9/2017 | Giusti | F24D 19/1054 |
| 2018/0094413 | A1* | 4/2018 | Chaky | E03C 1/055 |
| 2018/0231132 | A1* | 8/2018 | Brusin | F16K 1/526 |
| 2018/0354776 | A1* | 12/2018 | Lee | B01D 35/005 |

* cited by examiner

THERMOSTATIC DEVICE AND SANITARY WATER SUPPLY AND/OR DISPENSING SYSTEM COMPRISING SUCH A THERMOSTATIC DEVICE

RELATED APPLICATION

This application claims priority to Italian Patent Application No. 102018000005057 filed May 3, 2018, the entirety of which is incorporated by reference.

FIELD OF INVENTION

The present invention relates to a thermostatic device which can be installed in a pipeline of a sanitary water supply and/or dispensing system and which comprises a temperature meter, a flow regulator and a control unit. The invention is also directed to a method of regulating a flow rate of sanitary water in a pipeline of a sanitary water supply and/or dispensing system and to a calibration method of a flow regulator installed in a pipeline of a sanitary water supply and/or dispensing system.

BACKGROUND OF INVENTION

The typical architecture of a hot sanitary water supply system involves the installation of a series of utilities, for example taps or other sanitary appliances, located downstream of a thermal power generator, in particular a boiler. Unfortunately, this architecture is subject to inefficiencies: in fact, when the user of the system, acting on a tap, sends a request for hot sanitary water to the generator, the generator takes a considerable time (sometimes even a few minutes) to supply the user with sanitary water at the temperature desired by the user. In this way, a considerable volume of water is wasted, and a significant amount of energy is also wasted, the wasted energy being all the energy dissipated by the generator until the desired temperature is reached. Such wastes are experienced daily in most households. For example, a very common situation is one in which, having decided to take a shower, the hot water tap opens and one waits for a few minutes (letting the water flow at maximum flow and usually with maximum temperature request) for the water to reach the desired temperature.

Considering for example that an authoritative research (conducted by the UK authority to promote efficiency in water consumption) has shown that 75% of men and 71% of women actually take less than ten minutes to make a shower, it inevitably follows that the length of time needed to reach the desired water temperature is comparable to the period in which hot water is used for the shower. From a similar common example, which occurs almost daily in all homes, both the relevance and the scope of the problem are fully understood.

The fact, in fact, that the hot sanitary water supply systems are currently installed in almost all of our homes testifies the extent of the water and energy wastes that occur there, as well as the urgency to remedy (or at least appreciably limit) such large-scale waste.

SUMMARY OF THE INVENTION

In the light of the aforementioned drawbacks, an innovative technical solution has been conceived which allows significantly limiting the waste of water and energy of a domestic hot water supply system, in particular for use in households. A thermostatic device has been conceived which may be configured to distinguish itself both in terms of the energy efficiency which it is able to impart to the system, and for the ease of use and for the additional functions that are provided precisely because of the installation of such a thermostatic device. The thermostatic device to be manufactured is particularly cost-effective and simple both in production and in installation and is designed to be able to use network functionality.

A thermostatic device has been conceived which can advantageously be used to obtain fine adjustments of the systems, also because of its ability to be integrated in adequately complex control systems. The thermostatic device may be capable of performing detections relating both to its operation and to the operation of a generator located upstream thereof.

A method of operation of such a thermostatic device has been conceived, as well as a method of calibrating it, which allows accurately controlling the domestic hot water supply system in which the thermostatic device is installed and therefore ensure that the thermal power and the flow rate supplied are fully compliant with the efficient achievement of the desired conditions.

The thermostatic device may be integrated into domestic mains without the need for particular adjustments during installation, but which allows optimal operation regardless of the type of boiler located upstream of the device and the requirements of operation of the latter (for example the minimum activation rate).

The thermostatic device and/or by a system comprising such a thermostatic device and/or by an adjustment method and/or a calibration method, may be embodied as one or more of the following aspects.

A first independent aspect relates to a thermostatic device installable in a duct of a sanitary water supply and/or dispensing system, comprising:

a temperature meter, configured to detect the temperature of the sanitary water in and out of said thermostatic device, a flow regulator, configured to regulate the flow of sanitary water at the outlet of said thermostatic device, and a control unit, operatively connected to both said temperature meter and to said flow regulator, wherein said flow regulator is arranged to operate according to a first operating mode and according to a second operating mode, being:

the first operating mode is a steady-state operating mode, in which the flow of sanitary water at the outlet of said thermostatic device is a steady-state flow rate $Q_{reg}$, and the second operating mode is an operating mode to reach the steady state, in which the flow of sanitary water exiting from said thermostatic device is a flow rate lower than said steady-state flow rate $Q_{min}$, for example a minimum flow rate $Q_{min}$, said control unit being configured to acquire and/or calculate a reference temperature $T_{ref}$ and to arrange a switching of the operating mode of said flow regulator from said second operating mode to said first operating mode when a temperature of the sanitary water detected $T_{mes}$, by means of said temperature meter, is in a predetermined relation with respect to said reference temperature $T_{ref}$ such as when the detected sanitary water temperature $T_{mes}$ is greater than or equal to said reference temperature $T_{ref}$.

Said temperature detected $T_{mes}$ being greater than or equal to said reference temperature $T_{ref}$ is intended to mean a temperature detected in a neighborhood of the set reference temperature taking into account the operating tolerances of the device during the detection (for example, ±3° C.).

A second independent aspect relates to a thermostatic device installable in a duct of a sanitary water supply and/or dispensing system, comprising:

a temperature meter, configured to detect the temperature of the sanitary water entering, exiting or flowing through said thermostatic device, a flow regulator, configured to regulate the flow of sanitary water flowing out from said thermostatic device and a control unit, operatively connected to both said temperature meter and to said flow regulator, wherein said flow regulator is arranged to operate according to a first operating mode and according to a second operating mode, wherein:

the first operating mode is a steady-state operating mode, in which the flow of sanitary water at the outlet of said thermostatic device is a steady-state flow rate, and the second operating mode is an operating mode to reach the steady state, in which the flow of sanitary water exiting from said thermostatic device is a reduced flow rate lower than said steady-state flow rate, for example a minimum flow rate ($Q_{min}$), said control unit being configured to acquire and/or calculate a reference temperature ($T_{ref}$) and to arrange the switching of the operating mode of said flow regulator from said second operating mode towards said first operating mode when a temperature of sanitary water measured by said temperature meter is in a predetermined relationship to the said reference temperature ($T_{ref}$), such as when temperature of sanitary water measured by said temperature meter is greater than or equal to said reference temperature, characterized in that said control unit is further configured to perform a calibration procedure to determine a set degree of opening of the flow regulator causing said reduced flow rate to exit from said thermostatic device.

According to a further aspect depending on the previous aspects, the control unit in executing said calibration procedure, is configured for:

arranging said flow regulator to a prefixed degree of opening, said prefixed degree of opening being anyone of the flow regulator configurations included between a fully closed condition in which no water can flow through the thermostatic device and a maximum water flow passage open condition in which the maximum water flow can pass through the thermostatic device, said flow regulator configurations also comprising the fully closed condition and the maximum water passage open condition;

in case a water flow passes through the thermostatic device when the flow regulator is at said prefixed degree of opening, decreasing the degree of opening of the flow regulator until no more water flow passes through the thermostatic device and determining the set degree of opening of the flow regulator based on the degree of opening causing the switch between water flow rate and absence of the water flow rate;

in case no water passes through the thermostatic device when the flow regulator is at said prefixed degree of opening, increasing the degree of opening of the flow regulator until a flow of sanitary water is detected through said thermostatic device and determining the set degree of opening of the flow regulator based on the degree of opening causing the switch between absence of the water flow rate and presence of the water flow rate.

According to a further aspect depending on the previous aspect, the set degree of opening of the flow regulator is higher than the degree of opening of the flow regulator causing the switch, for example being higher by a percentage between 1% to 25%, in particular higher by a percentage of more than 5%.

According to a further aspect depending on the previous aspects, the device further includes a flow meter, configured to detect the flow of the sanitary water passing through said thermostatic device, and wherein said control unit is operatively connected to the flow meter, wherein said flow meter is used to detect the flow of sanitary water through said thermostatic device, in particular said flow meter is used to detect the flow of sanitary water through said thermostatic device and said reduced flow rate corresponds to the flow rate measured by said flow meter in relation to the set degree of opening of the flow regulator.

According to a further aspect depending on the previous aspects, the reference temperature $T_{ref}$ is a temperature below the steady state temperature $T_{reg}$ of the hot water from the boiler, i.e. lower than the maximum outlet temperature of the hot water as set. By way of example only, if the operating temperature $T_{reg}$ of the hot water leaving the boiler is 60° C., corresponding to the maximum temperature (usually set) at which the boiler can supply hot sanitary water, the reference temperature $T_{ref}$ could be 40° C. so that the switching between said second and first operating modes can take place before reaching the maximum temperature, providing the user with a steady flow of water (steady state flow) or in any case a water flow higher than the minimum flow (minimum rate).

A second aspect, which depends on the first aspect, relates to a thermostatic device which can be installed in a pipeline of a sanitary water supply and/or dispensing system, wherein said switching consists of a transition, ideally instantaneous (or very fast), of the opening degree of said flow regulator from a minimum flow to the steady state flow rate.

A third aspect, which depends on the first aspect, relates to a thermostatic device which can be installed in a pipeline of a sanitary water supply and/or dispensing system, wherein said switching occurs by varying the opening degree of said flow regulator in a time interval according to a predetermined profile function at least the detected sanitary water temperature. For example, said time interval being greater than 5 seconds, in particular more than 10 seconds.

A fourth aspect, which depends on the third aspect, relates to a thermostatic device which can be installed in a pipeline of a sanitary water supply and/or dispensing system, wherein said profile is a profile at least partly in discrete steps and comprises a plurality of discrete transitions (each ideally instantaneous) of the opening degree of said flow regulator. Each discrete transition being followed by a time interval (e.g. >0.1 second) without variations in the opening degree.

A fifth aspect, which depends on the third aspect or on the fourth aspect, relates to a thermostatic device which can be installed in a pipeline of a sanitary water supply and/or dispensing system, wherein said profile is a profile at least partly continuous and comprises a progressive and increasing increase in the opening degree of said flow regulator.

A sixth aspect, which depends on the fifth aspect, relates to a thermostatic device which can be installed in a pipeline of a sanitary water supply and/or dispensing system, wherein such a progressive increase follows a linear or quadratic law.

In a further aspect according to any one of the preceding aspects from three onwards, the switching occurs by varying the opening degree of said flow regulator according to a predetermined profile over time depending on the temperature of the sanitary water detected $T_{mes}$ and the reference temperature $T_{ref}$.

In a further aspect according to any one of the preceding aspects, the reference temperature $T_{ref}$ is a temperature below the steady state temperature $T_{reg}$ of the hot water leaving the boiler and the switching starts when the temperature of the sanitary water detected $T_{mes}$ reaches (for example in a neighborhood of ±3° C.) the reference temperature $T_{ref}$ and this occurs by varying the opening degree of said flow regulator according to a predetermined profile over time.

In a further aspect according to the preceding aspect, the flow rate lower Q than said rate at steady state $Q_{reg}$ of the second operating mode increases as the temperature of the detected sanitary water increases $T_{mes}$ until reaching such a steady state flow rate $Q_{reg}$.

In a further aspect according to the two preceding aspects, the flow rate lower $Q_{min}$ than said rate at steady state $Q_{reg}$ of the second operating mode increases as the temperature of the detected sanitary water increases $T_{mes}$ until reaching such a steady state flow rate $Q_{reg}$, wherein the steady state flow rate $Q_{reg}$ is supplied by the thermostatic system when the sanitary water temperature detected $T_{mes}$ is in a neighborhood (e.g. +5° C.) of a steady-state temperature $T_{reg}$ of the hot water leaving the boiler, in particular when the temperature of the sanitary water detected $T_{mes}$ is equal to the operating temperature $T_{reg}$ of the hot water leaving the boiler.

In a further aspect according to the three preceding aspects, the flow rate lower $Q_{min}$ than said steady-state rate $Q_{reg}$ of the second operating mode increases, up to reaching said steady-state flow rate $Q_{reg}$, upon the decrease of a temperature difference $\Delta T_1 = T_{reg} - T_{mes}$ between a steady-state temperature $T_{reg}$ of the hot water leaving the boiler and the detected temperature of the sanitary water $T_{mes}$. In particular, the increase in the flow rate may follow a continuous profile, a discrete step profile or a combination of the two continuous and discrete profiles.

In a further aspect according to the four preceding aspects, the flow rate lower $Q_{min}$ than said steady-state rate $Q_{reg}$ of the second operating mode increases, up to reaching said steady-state flow rate $Q_{reg}$, upon the increase of a temperature difference $\Delta T_2 = T_{mes} - T_{ref}$ between the detected sanitary water temperature $T_{mes}$ and the reference temperature $T_{ref}$. In particular, the increase in the flow rate may follow a continuous profile, a discrete step profile or a combination of the two continuous and discrete profiles.

In a further aspect according to any one of the preceding aspects, in the switching between said second and first operating mode, a ratio φ between the variation $\Delta T_1$ relative to the temperature of the sanitary water and a corresponding variation $\Delta Q$ in the flow rate is substantially constant in at least a portion of said profile, and in particular for all of said profile, in other words the increase in the flow rate is linear with the increase in temperature or equivalently with the decrease in $\Delta T_1$.

In a further aspect according to any one of the preceding aspects, in the switching between said second and first operating mode, a ratio φ between a temperature variation $\Delta T_v = (T'_1 - T''_1)$, wherein $T'_1 > T''_1$ relative to the temperature of the sanitary water and a corresponding variation in the flow rate $\Delta Q = (Q'' - Q')$, wherein $Q' < Q''$ and to any value $T'_1$ and $T''_1$ corresponds one and only one value respectively $Q'$ and $Q''$, is $$\varphi = \frac{\Delta T_v}{\Delta Q} < 1$$

in at least a portion of said profile, and in particular for all of said profile. This situation defining an opening profile which defines a greater initial opening of the valve to dispense more sanitary water in advance, well before reaching the steady-state temperature $T_{reg}$ at the expense of the energy efficiency.

In a further aspect according to any one of the preceding aspects, in the switching between said second and first operating mode, a ratio φ between a variation $\Delta T_v = (T'_1 - T''_1)$, wherein $T'_1 > T''_1$ relative to the temperature of the sanitary water and a corresponding variation $\Delta Q = (Q'' - Q')$, wherein $Q' < Q''$ and to any value $T'_1$ and $T''_1$ corresponds one and only one value respectively $Q'$ and $Q''$, of flow rate is $$\varphi = \frac{\Delta T_v}{\Delta Q} > 1$$

in at least a portion of said profile, and in particular for all of said profile. This situation defining an opening profile which defines a lower initial opening of the valve to dispense less sanitary water before reaching the steady-state temperature $T_{reg}$ to the advantage of the energy efficiency.

In a further aspect according to any one of the preceding aspects, the switching takes place by varying the opening degree of said flow regulator according to a predetermined reference profile over time as a function of a difference between said measured sanitary water temperature and said reference temperature ($\Delta T_2 = T_{mes} - T_{ref}$); for example the flow rate of sanitary water exiting from said thermostatic device increasing proportionally with respect to the temperature difference between the detected temperature and the reference temperature, upon reaching the steady-state temperature $T_{reg}$, the device dispensing the steady-state flow rate $Q_{reg}$.

A seventh aspect, depending on any aspect between the first aspect and the last aspect, relates to a thermostatic device which can be installed in a pipeline of a sanitary water supply and/or dispensing system, further comprising a flow meter, configured to detect the flow rate of the sanitary water passing through said thermostatic device, and wherein said control unit is operatively connected to said flow meter.

An eighth aspect, depending on the seventh aspect, relates to a thermostatic device which can be installed in a pipeline of a sanitary water supply and/or dispensing system, wherein in said first operating mode of said flow regulator, said control unit is arranged to use the flow rate detected by said flow meter as a control and/or feedback signal of the opening degree of said flow regulator.

A ninth aspect, depending on the seventh aspect or on the eighth aspect, relates to a thermostatic device which can be installed in a pipeline of a sanitary water supply and/or dispensing system, wherein said flow meter includes a calibrated orifice and is sensitive to the pressure difference between a first region upstream of said calibrated orifice and a second region downstream of said calibrated orifice, the flow rate being determined as a function of the detected pressure difference.

A tenth aspect, depending on the ninth aspect, relates to a thermostatic device which can be installed in a pipeline of a sanitary water supply and/or dispensing system, wherein said thermostatic device comprises:

an operative seat having a first gap and a second gap configured to put said operating seat in fluid communication with said first region and said second region, respectively;

a sealing casing inserted in said operating seat and in turn defining a respective inner volume;

a sensitive element accommodated in said casing to divide the inner volume of said casing at least in a first chamber and in a second chamber, a first surface of said sensitive element being directed towards said first chamber, a second surface of said sensitive device being directed towards said second chamber;

a first pressure intake formed on said casing, said first gap being in communication with said first chamber through said first intake, and a second pressure intake formed on said casing, said second gap being in communication with said second chamber through said second intake.

An eleventh aspect, depending on the ninth aspect or on the tenth aspect, relates to a thermostatic device which can be installed in a pipeline of a sanitary water supply and/or dispensing system, further comprising a variator of at least one geometric characteristic of said orifice, said variator being capable of arranging the orifice in a plurality of distinct configurations each of which corresponds a respective geometric characteristic of the orifice, the geometric characteristic of the orifice variable by means of said variator comprising in particular one or more of:

a linear dimension characteristic of said orifice, such as a diameter of said orifice;

an area characteristic of said orifice, such as an area of the fluid passage section through said orifice, and a profile of said orifice.

In a further aspect, the flow rate meter device is a ultrasonic, turbine, electromagnetic, Vortex or other equivalent flow meter.

A twelfth aspect, depending on any aspect between the first aspect and the eleventh aspect, relates to a thermostatic device which can be installed in a pipeline of a sanitary water supply and/or dispensing system, wherein said control unit is configured to perform a calibration procedure, aimed at determining and/or storing in said control unit the reduced flow rate lower than said steady-state flow rate, for example the minimum flow rate $Q_{min}$.

A thirteenth aspect, which depends on the twelfth aspect, relates to a thermostatic device which can be installed in a pipeline of a sanitary water supply and/or dispensing system, wherein said calibration process provides for arranging said flow regulator to a minimum opening degree, then to progressively increase said opening degree and finally to determine and store the value of the opening degree or of the flow rate (and for example interrupt the progressive increase of said opening degree) when a flow of sanitary water is detected through said thermostatic device. In particular, the value of the opening degree or of the flow rate determined may not correspond respectively to the minimum opening degree of the flow regulator and to the minimum flow rate that can be dispensed, but will correspond to the value of the opening degree or flow rate that will be set as minimum values upon completion of the calibration procedure (the minimum flow rate is the one that allows the activation of the boiler upstream of the device). Obviously, the minimum opening and/or minimum flow rate stored and/or used by the device may be slightly higher than those detected (e.g. 5% or 10% higher) to ensure the effective activation of the boiler.

A further aspect according to the preceding aspect relates to a thermostatic device which can be installed in a pipeline of a sanitary water supply and/or dispensing system, wherein the control unit keeps track of the number of domestic hot water requests. In detail, at each predetermined number of domestic hot water requests, the control unit provides to repeat the calibration procedure according to the preceding aspect. The new values determined relative to the opening degree or flow rate to guarantee the flow of sanitary water, are therefore stored by the control unit as minimum values of the opening degree or minimum flow $Q_{min}$ of the flow regulator.

A fourteenth aspect, depending on the twelfth or thirteenth aspect, relates to a thermostatic device which can be installed in a pipeline of a sanitary water supply and/or dispensing system, wherein during said calibration process, said temperature meter is used to detect the flow of sanitary water through said thermostatic device, in particular said minimum flow rate is established by the opening degree of said flow regulator at the moment in which a temperature variation (for example a variation of 3° C.) occurs, detected by the temperature meter with respect to a temperature detected at the beginning of the calibration process in a predetermined time interval (for example less than 10 seconds). The variation will generally be a temperature increase due to boiler activation. However, this variation could also be a decrease in temperature, where cooler water than the stationary one in the pipeline at the temperature meter should flow before it begins to heat up. In general, a sudden change in temperature indicates the presence of a water flow.

A fifteenth aspect, which depends on the seventh aspect and on the fourteenth aspect, relates to a thermostatic device which can be installed in a pipeline of a sanitary water supply and/or dispensing system, wherein during said calibration process, said flow meter is used to detect the flow of sanitary water through said thermostatic device and said minimum flow corresponds to the flow rate measured by said flow meter in relation to the minimum opening degree of the flow regulator.

A sixteenth aspect, depending on any aspect between the first aspect and the fifteenth aspect, relates to a thermostatic device which can be installed in a pipeline of a sanitary water supply and/or dispensing system, wherein said control unit is suitable for the calculation of one or more of:

the total volume of sanitary water supplied by said thermostatic device with minimum flow;

the total operating time of said thermostatic device with minimum flow;

the total volume of sanitary water supplied by said thermostatic device;

the total time of delivery of sanitary water by said thermostatic device and the average volume of sanitary water supplied by said thermostatic device.

A seventeenth aspect, depending on any aspect from the first aspect to the sixteenth aspect, relates to a thermostatic device which can be installed in a pipeline of a sanitary water supply and/or dispensing system, wherein said control unit is arranged to be operatively connected to a remote temperature meter and to perform the comparison between the temperature of the sanitary water detected by said temperature meter and the temperature of the sanitary water detected by said remote temperature meter, in particular said remote temperature meter being configured to detect a sanitary water temperature of the water mains upstream of a thermal power generator, or to detect the cold water temperature.

An eighteenth aspect, which depends on the seventeenth aspect, relates to a thermostatic device which can be installed in a pipeline of a sanitary water supply and/or dispensing system, wherein if said remote temperature meter is installed upstream of a thermal power generator serving said thermostatic device, said control unit is suitable for calculating one or more of:

the thermal power generated by said generator, and
the thermal energy generated by said generator.

A nineteenth aspect, depending on any aspect from the first aspect to the eighteenth aspect, relates to a thermostatic device which can be installed in a pipeline of a sanitary water supply and/or dispensing system, wherein said control unit is adapted to generate statistical and/or diagnostic information, such as for example the definition of a profile representative of the usual use of said thermostatic device and/or the identification of an abnormal use of said thermostatic device and/or the detection of a possible failure or loss downstream of said thermostatic device.

A twentieth aspect, depending on the sixteenth aspect or on the eighteenth aspect or on the nineteenth aspect, relates to a thermostatic device which can be installed in a pipeline of a sanitary water supply and/or dispensing system, said thermostatic device comprising means suitable for providing at least one information, in particular a screen or an audible alarm, and/or being connected to a communication network, in particular to a radio-frequency network or to a telephone network.

A twenty-first aspect, depending on any aspect from the first aspect to the twentieth aspect, relates to a thermostatic device which can be installed in a pipeline of a sanitary water supply and/or dispensing system, wherein said control unit is adapted to automatically reduce the opening degree of said flow regulator, in particular to automatically bring said flow regulator to its minimum opening degree (which may coincide with a closed position), in the event that:

the temperature detected by said temperature meter is higher than a predetermined temperature threshold (safety temperature); and/or the temperature detected by said temperature meter does not increase over time even though a flow has been detected through the device, in other words there is no decrease in the temperature difference $\Delta T_1$, for example the temperature increase not taking place for a period of time of over 5 or 10 seconds;

a possible fault; and/or
a loss downstream of said thermostatic device is detected by said control unit.

A twenty-second aspect relates to a sanitary water supply and/or dispensing system, comprising:

a thermal power generator, said generator comprising in particular a boiler;

at least one delivery line, served with sanitary hot water and connected to the outlet of said generator;

at least one utility, suitable for delivering sanitary hot water and connected to said delivery line, and a thermostatic device according to any aspect from the first aspect to the twenty-first aspect, said thermostatic device being installed on said delivery line between said generator and said at least one utility.

In a further aspect according to the preceding aspect, the minimum flow rate is the minimum flow rate which allows activation of the thermal power generator.

In a further aspect according to any one of the preceding aspects, the thermostatic device further comprises an electric actuator, the flow regulator being coupled to the electric actuator and the control unit controlling the electric actuator to determine the open condition of the flow regulator.

A twenty-third aspect, depending on the twenty-second aspect, relates to a sanitary water supply and/or dispensing system, said thermostatic device being according to the seventeenth aspect or according to the eighteenth aspect, wherein said system further comprises:

a supply line, connected upstream with a water network and downstream with said generator and a temperature meter, configured to detect the temperature of the sanitary water to said generator and operatively connected to said control unit.

A twenty-fourth aspect relates to a method of regulating a sanitary water flow rate in a pipeline of a sanitary water supply and/or dispensing system, comprising the steps of:

(A) making the flow of sanitary water correspond to a minimum flow;

(B) measuring the temperature of the sanitary water;

(C) comparing the measured temperature of the sanitary water with a reference temperature;

(D) recursively performing steps B) and C) until the measured temperature of the sanitary water is kept lower than said reference temperature, and (E) delivering a flow of sanitary water lower than a steady flow rate until the measured temperature of the sanitary water is equal to or higher than said reference temperature.

In a further aspect according to the preceding aspect, the method comprises the step of delivering a flow of sanitary water lower than a flow rate by varying it, and in detail increasing it, according to a flow rate profile which is at least a function of the detected temperature and in particular also of the reference temperature.

In a further aspect according to the preceding aspect, the profile is a function of the difference in temperature detected and the reference temperature; in particular when the measured temperature of the sanitary water is equal to or exceeds said reference temperature, the flow rate dispensed corresponding to the steady-state flow rate.

A further independent aspect refers to a calibration method of a thermostatic device having a flow regulator and installed in a conduit of a sanitary water distribution and/or delivery system, comprising the steps of:

(A) placing said flow regulator at a prefixed degree of opening, said prefixed degree of opening being anyone of flow regulator configurations included between a fully closed condition in which no water can flow through the thermostatic device and a maximum water flow passage open condition in which the maximum water flow can pass through the thermostatic device, said flow regulator configurations also comprising the fully closed condition and the maximum water passage open condition;

(B) determining whether a water flow passes through the thermostatic device when the flow regulator is at said prefixed degree of opening;

(C) in case a water flow passes through the thermostatic device when the flow regulator is at said prefixed degree of opening:

C1) decreasing the degree of opening of the flow regulator until no more water flow passes through the thermostatic device, and C2) determining the set degree of opening of the flow regulator based on the degree of opening causing the switch between water flow rate and absence of the water flow rate;

D) in case no water passes through the thermostatic device when the flow regulator is at said prefixed degree of opening:

D1) increasing the degree of opening of the flow regulator until a flow of sanitary water is detected through said thermostatic device, and D2) determining the set degree of opening of the flow regulator based on the degree of opening causing the switch between absence of the water flow rate and presence of the water flow rate.

In a further aspect according to the preceding aspect, the method comprises calculating the set degree of opening of the flow regulator by increasing the degree of opening of the flow regulator causing the switch, for example by increasing of a percentage between 1% to 25%, in particular by increasing of a percentage of more than 5%.

In a further aspect according to any one of the preceding two aspects, step A) comprises placing said flow regulator at its own minimum opening degree; step B) comprises determining whether a substantial flow-free condition or a condition of presence of sanitary water flow is present along said conduit; step D) comprises increasing the opening degree of said flow regulator; the method further comprising recursively performing steps B) and D) as long as the condition of substantial flow-free condition remains, and measuring and/or calculating the flow of sanitary water along said conduit when the presence of the flow of sanitary water is detected, this flow being identified as the reduced flow rate for said flow regulator.

A twenty-fifth aspect relates to a calibration method of a flow regulator installed in a pipeline of a sanitary water supply and/or dispensing system, comprising the steps of:

(A) placing said flow regulator at its own minimum opening degree;

(B) determining whether a substantial flow-free condition or a condition of presence of sanitary water flow is present along said conduit;

(C) increasing the opening degree of said flow regulator;

(D) recursively performing steps B) and C) as long as the condition of substantial flow-free condition remains, and (E) measuring and/or calculating the flow of sanitary water along said conduit when the presence of the flow of sanitary water is detected, this flow being identified as the minimum flow rate for said flow regulator.

In a further aspect according to the preceding aspect, wherein the presence of a sanitary water flow is detected when the control unit determines that the temperature detected by the temperature meter is varied (for example increased) by a predetermined value with respect to the temperature detected at the beginning of the calibration procedure.

SUMMARY OF FIGURES

All aspects listed herein, along with further aspects, are further described in detail in the following description relating to at least one non-limiting embodiment. This description refers to the accompanying figures, also provided only for illustrative and, therefore, non-limiting purposes, in which.

DETAILED DESCRIPTION OF THE INVENTION

Figure 1:
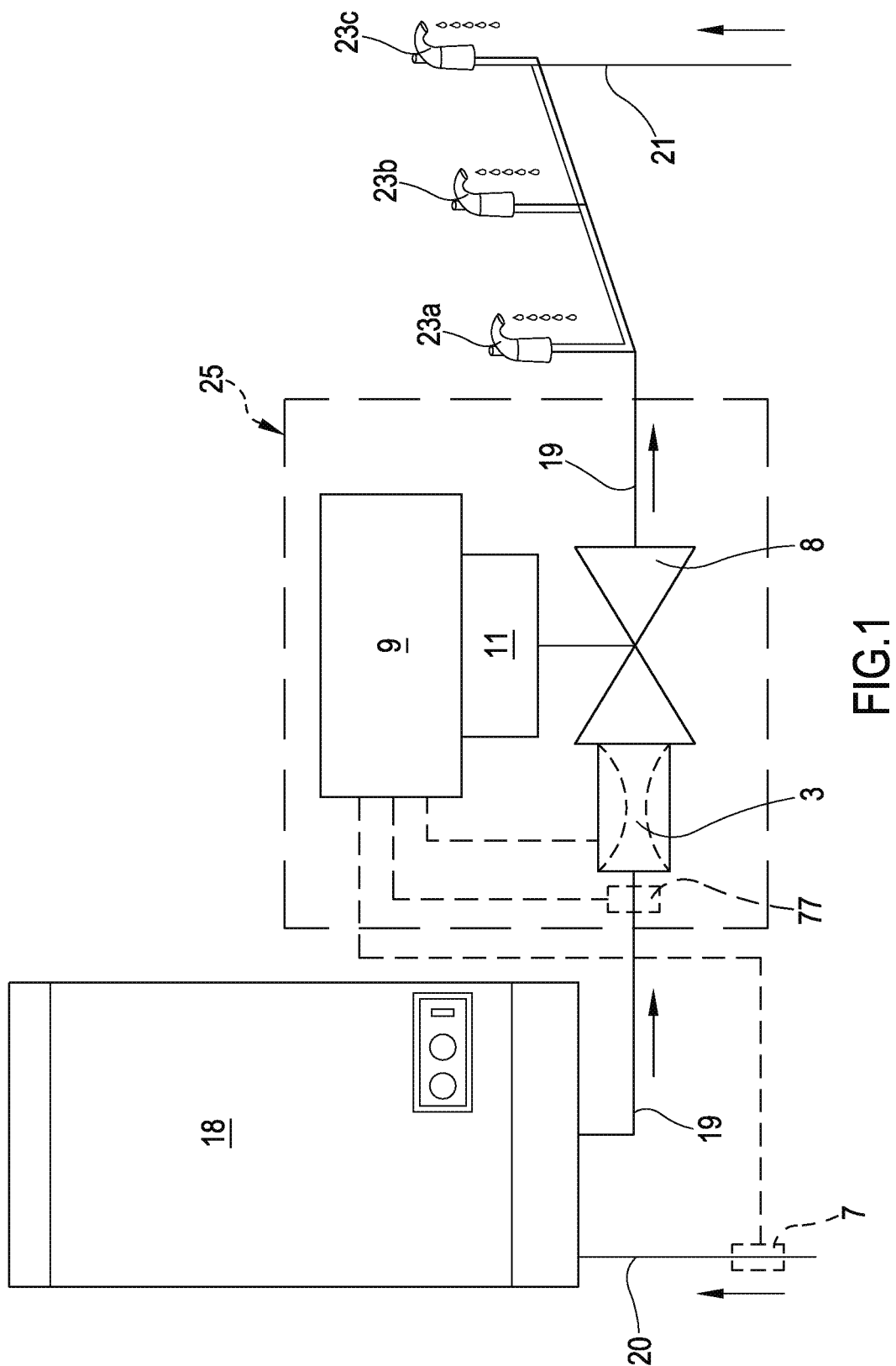
FIG. 1 illustrates a sanitary water supply and/or dispensing system, wherein a thermostatic device according to an embodiment is installed, which is in a first operating mode, such a first operating mode being an operating mode for steady-state operation.
Figure 2:
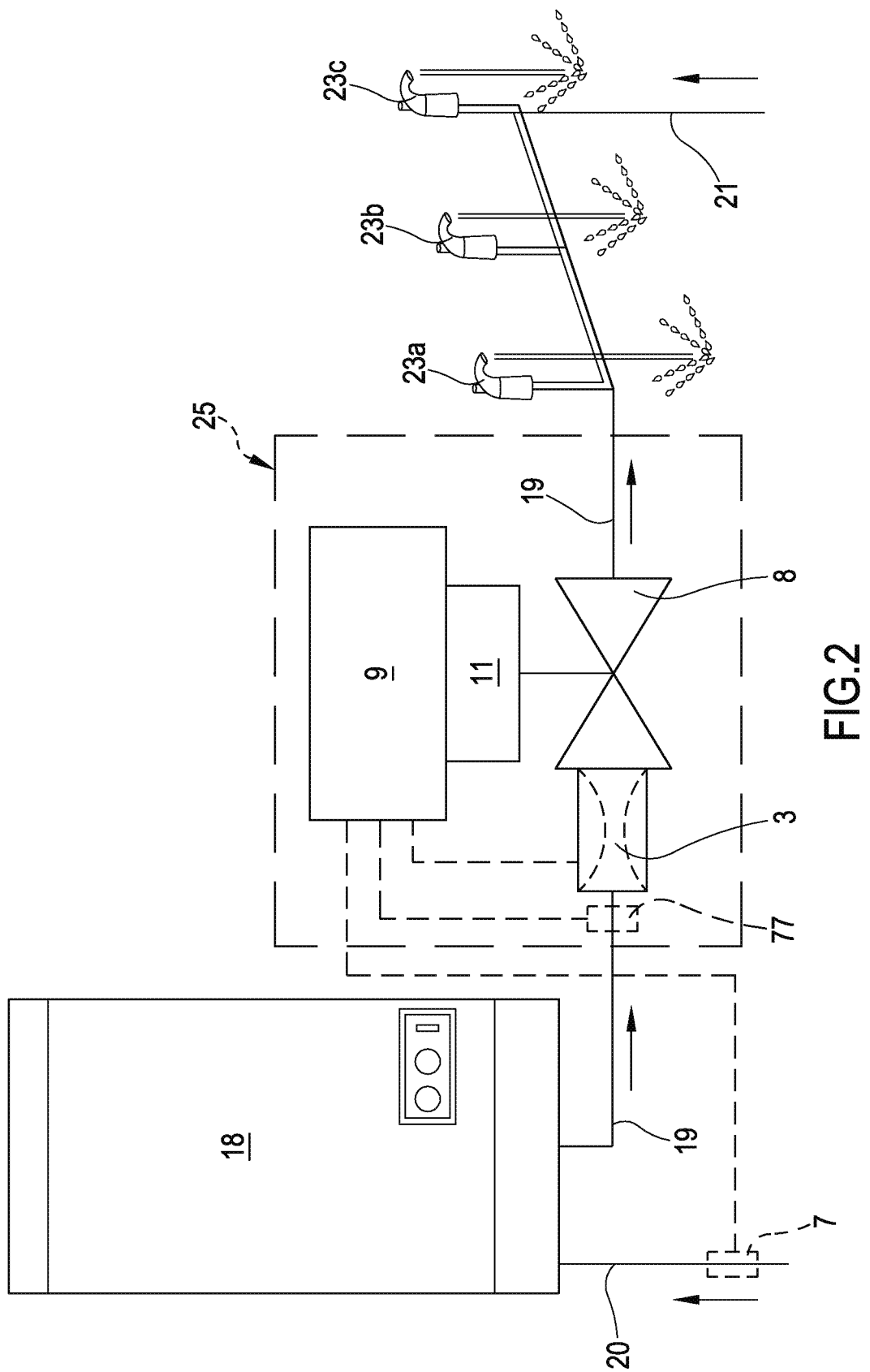
FIG. 2 illustrates a sanitary water supply and/or dispensing system, wherein a thermostatic device according to an embodiment is installed in a pipeline, which device is in a second operating mode, such a second operating mode being a steady-state operating mode.

FIG. 1 and FIG. 2 show a sanitary water supply and/or dispensing system, on a pipeline whereof a thermostatic device 25 according to an embodiment is installed. Such a system, in addition to the thermostatic device 25, also includes a thermal power generator 18, in particular a boiler, and at least one utility for the supply of sanitary hot water. In the embodiment shown in FIG. 1 and in FIG. 2, three utilities 23a, 23b, 23c are present by way of non-limiting example, such utilities 23a, 23b, 23c integrating in particular taps which allow the user of the system to regulate both the flow rate and the temperature of the sanitary water flow exiting each of these taps. The system is configured in such a way that the utilities 23a, 23b, 23c can also be activated simultaneously and can dispense sanitary water flows different from each other in terms of flow rate and/or temperature.

The generator 18 is fed with sanitary water through a supply line 20, in which cold water drawn from a water network circulates, while a delivery line 19 connects the generator 18, with the utilities 23a, 23b, 23c, in order to supply them with domestic hot water. In order to obtain an independent supply of each of the utilities 23a, 23b, 23c, the same are each arranged in flow intake on the delivery line 19. The utilities 23a, 23b, 23c are also supplied with sanitary cold water through a supply line 21, in which they are always arranged in parallel with each other. Since therefore each of the utilities 23a, 23b, 23c is supplied both with domestic hot water and with sanitary cold water, the taps integrated with the utilities 23a, 23b, 23c are arranged to perform a mixing between sanitary hot water and sanitary cold water, which is capable of rendering both the flow rate and the temperature of the sanitary water flow supplied by each of the utilities 23a, 23b, 23c fully meeting the user's requirements.

In the system shown in FIG. 1 and in FIG. 2, the thermostatic device 25, being installed on the delivery line 19, is therefore interposed between the generator 18 and the utilities 23a, 23b, 23c. In other words, the thermostatic device 25 is connected in series both to the generator 18, positioned upstream of the thermostatic device 25, and to the utilities 23a, 23b, 23c, the latter being all positioned downstream of the thermostatic device 25.

The thermostatic device 25 according to an embodiment is of the electronically controlled type and comprises a control unit 9, for example of the microcontroller type.

The thermostatic device 25 further comprises a flow regulator 8, configured to regulate the flow rate of the sanitary water leaving the thermostatic device 25, i.e. the flow rate of hot water supplied to the utilities 23a, 23b, 23c. The thermostatic device 25 advantageously comprises an electric actuator 11, the flow regulator 8 being mechanically coupled to the electric actuator 11. It should be noted that the present invention is independent of the specific type of flow regulator 8 used, as well as of the specific type of electric actuator 11 used.

The thermostatic device 25 further comprises a temperature meter 77, configured for detecting the temperature of the sanitary water, for example along the delivery line 19 downstream of the generator 18. The positioning of the temperature meter 77 (in particular the positioning of the sensitive element of the temperature meter 77) inside the thermostatic device 25 is such that it is arranged upstream with respect to the flow regulator 8, to be able to detect the temperature of the sanitary water entering the thermostatic device 25. Obviously the temperature meter 77 can also be positioned downstream of the flow regulator 8 (or even inside it), provided that it allows to determine the temperature of the hot water being dispensed. Also the type of temperature meter 77 is not relevant for the purposes of the present invention: for example, an NTC, PT100, PT1000, PT10K or equivalent temperature probe may be conveniently used.

The control unit 9 is operatively connected both to the temperature meter 77, and to the flow regulator 8 and/or to the electric actuator 11. Therefore it can receive an input signal from the temperature meter 77, for example a signal representing the temperature of the sanitary water along the delivery line 19 (or the temperature itself), and can transmit an output signal to the electric actuator 11, for example a command signal to set the flow regulator 8 to a certain opening degree.

According to an embodiment, the flow regulator 8 is arranged to operate according to a first operating mode, the first operating mode being a steady-state operating mode in which a steady flow rate is supplied (which may be a maximum deliverable flow rate), and according to a second operating mode, the second operating mode being a steady-state setting operating mode. The second operating mode differs from the first operating mode in that the flow rate of sanitary water leaving the thermostatic device 25 is lower than the flow rate, and includes, for example, a minimum flow rate $Q_{min}$, in particular a constant flow rate equal to the minimum flow rate that can be supplied through the delivery line 19. Ideally, it would be most profitable if the minimum flow value $Q_{min}$ was equal to zero (in order to eliminate the waste of sanitary water, as well as energy, in the system set-up step). However, due to the features of the generator 18, it is nowadays generally necessary to ensure that the flow rate of sanitary water along the delivery line 19 is different from zero even in the setting step; in fact, thermal power generators (i.e. boilers) need to request a minimum flow rate to be able to activate. If the required flow rate is less than this minimum flow rate $Q_{min}$ there is no heating of the fluid. In any case, since this flow rate of sanitary water is rather limited, the waste of sanitary water and energy that occurs during the setting up is in any case negligible by adopting what is proposed. The value of this minimum flow $Q_{min}$ is different from generator to generator, it is conveniently stored in the control unit 9 and is advantageously calculated by means of a specific calibration algorithm executed by the control unit 9 (such an algorithm/calibration method is an integral part of the present description and will be described hereafter in detail).

The different flow rate of sanitary hot water delivered through the delivery line 19 between the two operating modes of the thermostatic device 25 is evident from the comparison between FIG. 2, in which the flow regulator 8 is in the first operating mode (steady-state operation) and consequently each of the utilities 23a, 23b, 23c delivers the flow rate of sanitary water desired by the user, and FIG. 1, in which the flow regulator 8 is in the second operating mode (operating at full capacity) and consequently the utilities 23a, 23b, 23c (although the taps can be opened to deliver a high flow rate) deliver a total flow lower than the steady flow rate, for example the minimum flow rate of sanitary water that can be supplied through the delivery line 19. This is because the thermostatic device is regulating the flow rate by keeping it at a lower value than the required steady state.

According to an embodiment, the control unit 9 is configured to acquire and/or receive and/or calculate a reference temperature and arrange the switching of the operating mode of the flow regulator 8 from the second operating mode to the first operating mode when the temperature meter 77 detects a temperature of the sanitary water equal to or greater than the reference temperature. Advantageously, the reference temperature is a target temperature can be pre-set (for example in the factory) or even set (or changed with respect to the factory setting) subsequently by an operator (for example during installation) or even by the end user, if desired. This temperature can be a fixed value a priori or even depend on the temperature of the sanitary water set at the boiler (for example 10° C. or 20° C. lower than this temperature), in particular the regulation made by the user through the taps of the utilities 23a, 23b, 23c; in the latter case, this reference temperature will be higher the higher the temperature of the sanitary water requested by the user.

In a first embodiment, the switching of the operating mode of the flow regulator 8 from the second operating mode to the first operating mode consists in a transition (ideally instantaneous, that is rapid) of the opening degree of the flow regulator 8.

In this first embodiment, the reference temperature $T_{ref}$ may coincide with the temperature of the sanitary water requested by the user, or with the steady-state temperature $T_{reg}$ of the hot water to which the boiler is set. If for example the steady-state temperature $T_{reg}$ is 60° C., when this temperature is reached (coinciding with the reference temperature) the opening degree of the flow regulator 8 is switched from the minimum opening degree (corresponding to the minimum flow rate $Q_{min}$ through the delivery line 19) up to the maximum opening degree.

When the temperature meter 77 detects a temperature of the sanitary water greater than or equal to the reference temperature, the control unit 9 sends to the electric actuator 11 a control signal so that the same electric actuator 11 performs a step switching of the opening degree of the flow regulator 8 from the minimum opening degree (corresponding to the minimum flow rate $Q_{min}$ through the delivery line 19) up to the opening degree corresponding to the flow rate of sanitary water requested by the user, for example full opening. This operation is essentially of the on/off type, in which, however, the 'off' situation corresponds to the provision of a minimum flow rate $Q_{min}$ sufficient for the boiler activation.

In a second embodiment, the switching of the operating mode of the flow regulator 8 from the second operating mode to the first operating mode consists in a progressive variation of the opening degree of the flow regulator 8. In the second embodiment, the switching of the operating mode of the flow regulator 8 from the second operating mode to the first operating mode takes place through a variation of the opening degree of the flow regulator 8, which follows a predetermined profile. In this way, the user perceives that the temperature of the sanitary water requested by the user is about to be reached, seeing the flow rate of sanitary water increase with the passing of time.

On the basis of a first possible option in the context of the second embodiment, the profile followed by the opening degree of the flow regulator 8 in its path from the opening degree corresponding to the minimum flow rate $Q_{min}$ to the opening degree corresponding to the flow rate requested by the user is a profile at least partly in steps, that is to say, a discrete profile comprising a plurality of discrete variations in the opening degree of the flow regulator 8.

On the basis of a second possible option in the context of the second embodiment, the profile followed by the opening degree of the flow regulator 8 in its path, from the opening degree corresponding to the minimum flow rate $Q_{min}$, to the opening degree corresponding to the flow rate requested by the user, is a profile at least partly continuous, that is to say, a profile capable of achieving a progressive increase in the opening degree of the flow regulator 8. In this option, the path followed by the opening degree of the flow regulator 8, during the progressive variation that leads this opening degree from the opening degree corresponding to the minimum flow rate $Q_{min}$ to the opening degree corresponding to the flow rate requested by the user, can follow any mathematical law.

Figure 4A:
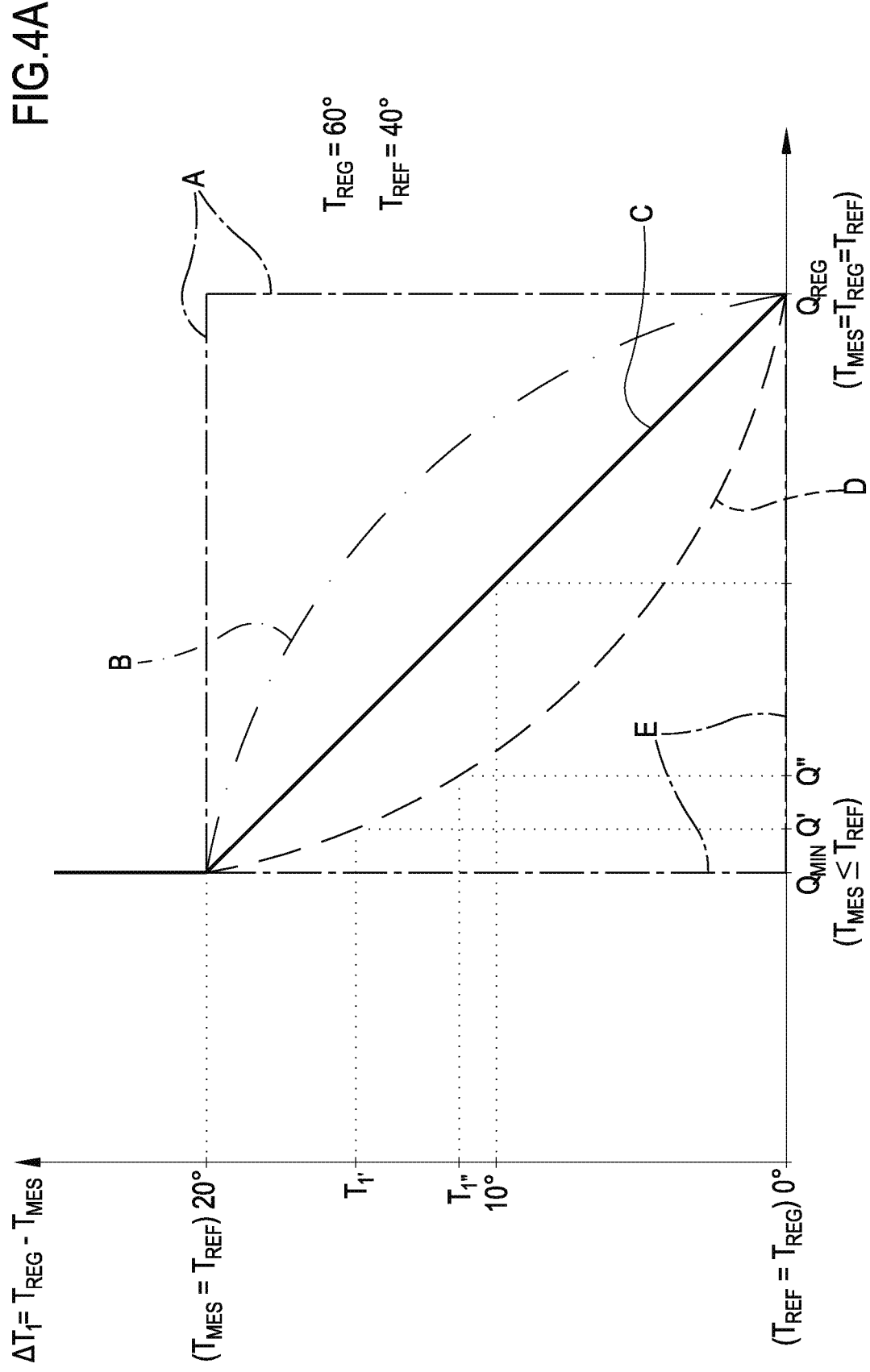
FIGS. 4A and 4B show exemplary diagrams showing the relationship between the variation in flow rate and the variation in differences between the measured temperature and the steady-state temperature or reference temperature.

In general, the second embodiment envisages that a predetermined opening profile is realized which is at least a function of the detected temperature and in particular function of a temperature difference $\Delta T_1$ equal to the difference between the reference temperature $T_{ref}$ and the detected temperature $T_{mes}$, so that the flow rate of sanitary water supplied by the thermostatic device is correlated to $\Delta T_1 = T_{ref} - T_{mes}$ according to any mathematical law. FIG. 4A shows, by way of non-limiting example, a plurality of predetermined opening profiles depending on the flow rate of the sanitary water supplied and the temperature variation $\Delta T_1$.

The opening profile A describes the sanitary water supply process in which a reference temperature of 40° is set. Following the request for domestic water from the user, a minimum flow is initially dispensed and the boiler starts to heat the water. As soon as the measured temperature reaches 40°, the maximum deliverable domestic hot water is immediately supplied to the user.

The opening profile B describes a process of supplying sanitary water according to a law that is initially monotonous decreasing and characterized in that the relationship $$\varphi = \frac{\Delta T_v}{\Delta Q} < 1,$$

with $\Delta T_v = (T'_1 - T''_1)$ and $\Delta Q = (Q'' - Q')$, where at any value $T'_1$ and $T''_1$ corresponds to one and only one value $Q'$ and $Q''$ respectively, where $T'_1 > T''_1$ and $Q' < Q''$. In other words this corresponds to saying that a slight variation in the temperature difference $\Delta T_v$ corresponds to a wider flow rate variation $\Delta Q$. Then, past the point where the derivative of the curve becomes greater than 1

$$\left(\varphi = \frac{\Delta T_v}{\Delta Q} > 1\right)$$

the curve becomes monotonic decreasing, that is, a variation in the temperature difference $\Delta T_v$ corresponds to a smaller and slight variation in the flow rate $\Delta Q$. The operation of the thermostatic device according to said opening profile allows delivering a quantity of sanitary water in advance with respect to reaching the operating temperature $T_{reg}$ (the condition $T_{reg} < T_{reg}$ is verified) at the expense of energy efficiency. In fact, when the threshold temperature is reached, the device starts to deliver a higher quantity of water to then reduce the further increases in flow rate until it reaches the steady-state flow rate. The user will therefore have a considerable flow of sanitary water at lower temperatures (but not cold water since the supply starts to increase compared to the minimum only when the reference temperature is reached), as soon as it is requested.

The opening profile C describes a process of supplying sanitary water according to a linear decreasing monotonic law, in other words a variation in the temperature difference $\Delta T_v$ corresponds to an equal variation in flow rate $\Delta Q$. In this case, an increase in temperature will correspond to an equivalent increase in the flow delivered.

The opening profile D describes a process of supplying sanitary water according to a law having a pattern opposite to that of profile B; the law is initially monotonous decreasing characterized in that the relationship $$\varphi = \frac{\Delta T_v}{\Delta Q} > 1,$$

with $\Delta T_v = (T'_1 - T''_1)$ and $\Delta Q = (Q'' - Q')$, where any value $T'_1$ and $T''_1$ corresponds to one and only one value $Q'$ and $Q''$ respectively, where $T'_1 > T''_1$ and $Q' < Q''$. In other words this corresponds to saying that a wide variation in the temperature difference $\Delta T_v$ corresponds to a slight flow rate variation $\Delta Q$. The law is reversed $$\left(\varphi = \frac{\Delta T_v}{\Delta Q} < 1\right)$$

after an initial step as the flow rate increases at this point more rapidly with each temperature change.

The operation of the thermostatic device according to said opening profile allows delivering a delayed quantity of sanitary water with respect to reaching the operating temperature $T_{reg}$ to the advantage of energy efficiency. The user will then have a reduced flow rate of sanitary water initially which is then increased more than proportionally at higher temperatures.

The opening profile E describes an ideal sanitary water supply process from the point of view of energy saving, characterized in that the flow rate of sanitary water is minimal until the temperature detected $T_{mes}$ of sanitary water is equal to the steady-state temperature $T_{reg}$. Upon the occurrence of this last condition, the flow of water supplied will be equal to the maximum flow rate that can be supplied by the thermostatic device.

It is worth noting that the graph in FIG. 4A shows two operating zones relating to the sanitary water supply process, in which the user has the right to choose the sanitary water supply profile that most meets his needs. In detail, if the user wants to promote energy efficiency, then the thermostatic device can follow any sanitary water supply profile, preset by the user himself, including in the area subtended by the profile C, vice versa, if the user wants to penalize energy efficiency to receive a quantity of sanitary water in advance ($T_{mes} < T_{reg}$), then the thermostatic device can follow any sanitary water supply profile, preset by the user himself, included in the difference area between the area under the profile A and the area under the profile C.

It is also worth noting that equality $T_{mes} = T_{reg}$ is considered verified when the detected temperature value $T_{mes}$ is within the range of values ($T_{reg}$ 5° C.; $T_{reg}$+5° C.).

Figure 4B:
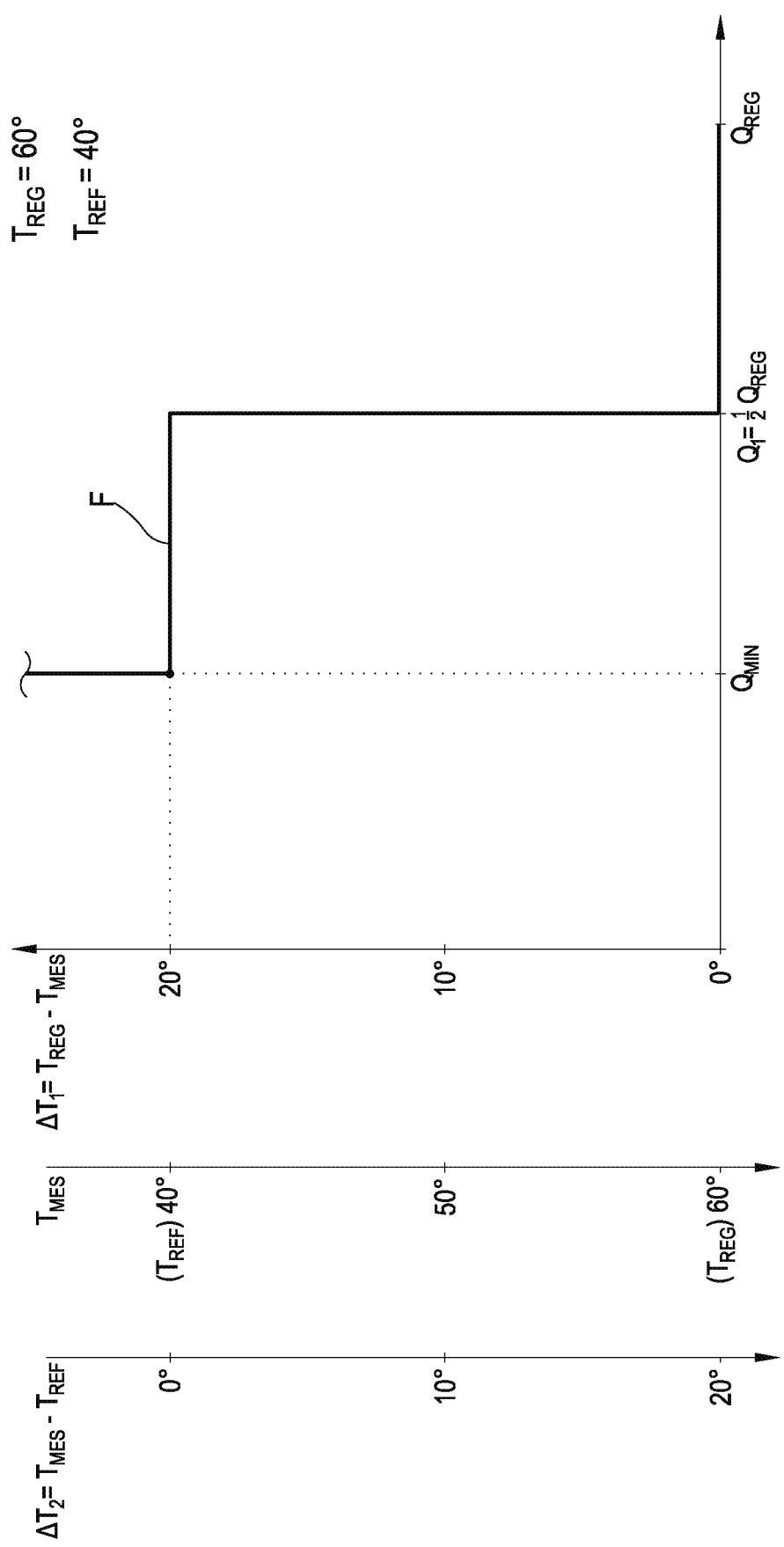

FIG. 4B shows a discrete opening profile F, which represents an approximation of a continuous profile. In this case, the thermostatic device delivers a minimum flow rate of sanitary water until the temperature difference $\Delta T_1$ is equal to zero (i.e. the reference temperature is reached—in this case equal to 40°). This allows the user to use a domestic hot water flow rate higher than the minimum sanitary water flow rate when 40° of the boiler water temperature is reached ($T_{mes}$=40° C.), in this example a flow rate equal to $Q'=\frac{1}{2}Q_{REG}$. Subsequently, when the condition $T_{MES}=T_{REG}$ or equivalently $\Delta T_1$=0 occurs, the user will be supplied with a sanitary water flow equal to $Q'=Q_{REG}$.

In particular, the thermostatic device 25 further comprises a flow meter 3, configured to detect the flow rate of the sanitary water that passes through the thermostatic device 25. Advantageously, the flow meter 3 is arranged upstream of the flow regulator 8 (therefore in the proximity of the temperature meter 77). Obviously it is not excluded to be able to position the same downstream of the regulator 8.

The control unit 9 is operatively connected to the flow meter 3, so as to be able to use the signal received from the flow meter 3 primarily to verify the presence of a sanitary water flow through the thermostatic device 25, and therefore to know the flow rate of such a sanitary water flow. Moreover the control unit 9, upon receipt of a request for a predetermined flow rate of sanitary water from the utilities 23a, 23b, 23c (deriving from the opening of one or more utilities that need heated water), and after the transmission of a consequent control signal to the electric actuator 11 (aimed at arranging the flow regulator 8 to the opening degree according to the profile followed by the temperature), is able to verify, by means of the flow meter 3, the total flow rate delivered to the utilities.

It should be noted that the present invention is independent of the technology on which the flow meter 3 is based. For example, the flow meter 3 may use ultrasonic turbine technology, Vortex, pressure difference ($\Delta P$), electromagnetic or others. In this case, the operating principle of the flow meter 3 is based on the difference in the transit times of a ultrasonic pulse through the sanitary water. This pulse, emitted by the flow meter 3, provides an output signal directly proportional to the speed of the sanitary water and thus to the instant flow rate thereof. Alternatively, the flow meter 3 may use the principle of vortex precession, theorized by Von Karman. When sanitary water flows and meets a suitable generating fin, alternating vortices are formed, which detach from both sides with opposite direction of rotation. Pressure fluctuations due to the formation of vortices are detected by a sensor and converted into electrical pulses. The vortices are generated regularly within the limits of application of the flow meter 3. As a result, the generation frequency of the vortices is directly proportional to the flow rate of sanitary water.

In one of the possible alternatives, the flow meter 3 is based on the detection of a differential pressure. In this case, the flow meter 3 comprises a calibrated orifice (that is to say a constriction which creates a restricted section in which the flow is made to pass) and an element sensitive to the pressure difference between a first region upstream of the calibrated orifice and a second region downstream of the calibrated orifice.

A possible embodiment of the flow meter 3 which uses the detection of a differential pressure provides a main body having an inlet opening, an outlet opening and a channel which places the inlet connection in communication fluid with the outlet opening. A calibrated orifice is arranged in the main body and is shaped in such a way that when a flow of sanitary water runs through the channel between the inlet opening and the outlet opening, a pressure difference is generated between a first region a second region within the main body, the first region being located upstream of the calibrated orifice, the second region being instead located downstream of the calibrated orifice. The main body then comprises a housing defining at its interior an operating seat distinct from the channel, which has a first gap and a second gap configured to put the operating seat in fluid communication with the first region and the second region, respectively. A sealing casing is inserted within the operating seat. The sensitive element is accommodated in the sealing casing so as to divide the inner volume of the casing at least in a first chamber and in a second chamber, a first surface of the sensitive element being directed towards the first chamber, a second surface of the sensitive device being instead directed towards the second chamber. Finally, a first pressure intake and a second pressure intake are formed on the casing, the first gap being in communication with the first chamber through the first pressure intake, the second gap communicating with the second chamber through the second pressure intake.

For the flow meter 3, when suitable for detecting the differential pressure, to have a wide detection range, as well as a rather low value of a minimum detectable differential pressure (and therefore of minimum detectable flow rate, even significantly less than 30 l/h), without affecting the accuracy and resolution of the detection, advantageously a variator of a geometric characteristic is associated with the calibrated orifice. The variator is capable of arranging the calibrated orifice in a plurality of distinct configurations, each of which corresponds to a respective geometric characteristic of the calibrated orifice. The geometric characteristic of the calibrated orifice variable by means of the variator can be a characteristic linear dimension of the calibrated orifice, such as for example a diameter of the calibrated orifice. Alternatively, the geometric characteristic of the calibrated orifice variable by means of the variator can be a characteristic area of the calibrated orifice, for example an area of the fluid passage section through the calibrated orifice. According to a further alternative, the geometric characteristic of the calibrated orifice variable by means of the variator can be a shape of the calibrated orifice.

The variator may be configured for varying the geometric characteristic of the calibrated orifice in a discrete manner among a plurality of predefined geometric characteristics. Alternatively, the variator can be configured to vary the area of the passage section through the calibrated orifice between a plurality of progressively increasing discrete values from a minimum value up to a maximum value.

According to a profitable embodiment of the variator, the same comprises a first selector element, a second selector element and an actuator. The first selector element and the second selector element are both disc or drum shaped and are mutually adjacent and substantially coaxial. The first selector element is mounted in a fixed angular position, while the second selector element is coupled to the variator actuator, the latter being suitable for rotating the second selector element with respect to the first selector element. On one of the selector elements there is an opening, while on the other selector element there are holes, whose number corresponds to the number of the geometric characteristics of the calibrated orifice. The switching from a first predefined value of the geometrical characteristic of the calibrated orifice to a second predefined value of the geometrical characteristic of the calibrated orifice is performed by means of the variator actuator, by rotating the second selector element so as to modify the relative angular position between the second selector element and the first selector element from a first relative angular position (in which the opening is substantially aligned with a first hole) to a second relative angular position (in which the opening is substantially aligned with a second hole).

The control unit 9 is configured to perform the method for the regulation of a flow rate of sanitary water in a pipeline of a sanitary water supply and/or dispensing system. Such a method comprises the steps of:

(A) making the flow of sanitary water correspond to a minimum flow $Q_{min}$;

(B) measuring the temperature of the sanitary water;

(C) comparing the measured temperature of the sanitary water with a reference temperature;

(D) recursively performing steps B) and C) until the measured temperature of the sanitary water is kept lower than the reference temperature, and (E) increasing the flow of sanitary water up to a reference flow rate until the measured temperature of the sanitary water exceeds or is equal to said reference temperature.

Figure 3:
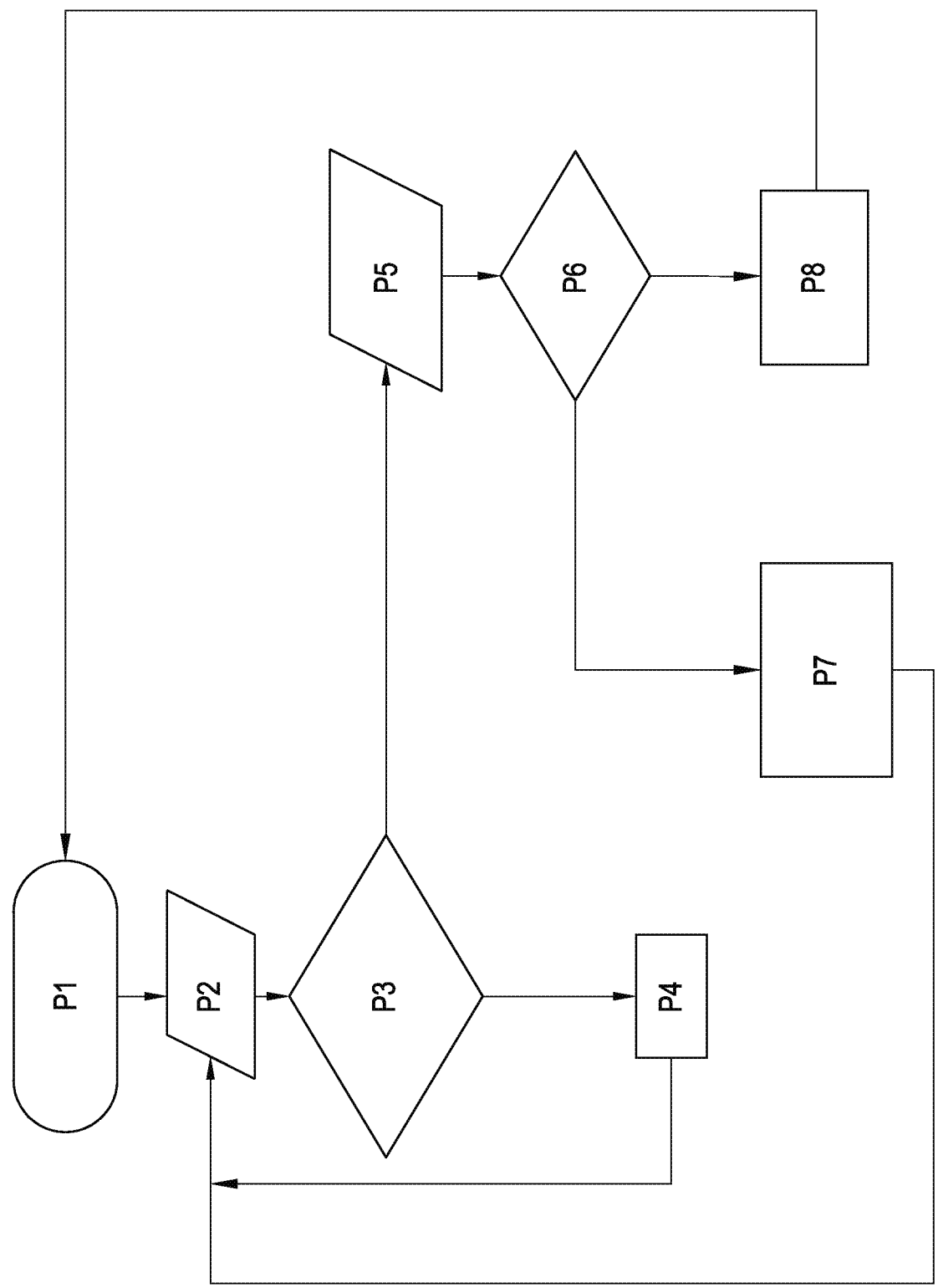
FIG. 3 shows, in the form of a block diagram, a method of adjusting a flow rate which can be carried out by a thermostatic device according to an embodiment.

FIG. 3 shows a block diagram of an algorithm executable by the control unit 9 of the thermostatic device 25, which represents a possible implementation of the adjustment method according to an embodiment.

Block P1 represents the start of the adjustment method. The control unit 9 of the thermostatic device 25 has just been informed that the user has requested (typically by acting on one or more taps) the delivery of a determined flow of sanitary water by the utilities 23a, 23b, 23c, such determined flow rate of sanitary water, having to be heated by the generator 18 to a certain temperature before dispensing (for example the temperature ACS set on the generator 18). Once this temperature is known (which can be pre-stored in the control unit), the control unit 9 proceeds to calculate the reference temperature, i.e. the temperature of the sanitary water to which the subsequent switching of the operating mode of the flow regulator 8 from the second operating mode (transient, steady state setting) to the first operating mode (steady-state operation). It should be noted that the reference temperature may also be a pre-stored value (at the factory, by the installer and/or by the user), obviously the reference temperature must be lower than or at most equal to the set temperature of the domestic hot water in the boiler. Furthermore, the reference temperature may be dependent or not on the temperature ACS set on the generator 18. For example, it may be a percentage value from the temperature ACS or a value of a predetermined number of degrees lower than the same, even to a pre-set absolute value.

The reference temperature may coincide with the temperature ACS (especially if it is then intended to carry out an ideally instantaneous switching of the operating mode of the flow regulator 8) or be adequately lower than it. Having been informed of the domestic hot water demand by the user, the control unit 9 sends a command signal to the electric actuator 11 so as to place the flow regulator 8 at the minimum opening degree (corresponding to the minimum flow rate $Q_{min}$ of sanitary water along the delivery line 19 such as to activate the heating generator).

In block P2, the temperature of the sanitary water is detected by means of the temperature meter 77 which, being operatively connected to the control unit 9, instantly transmits to the latter the detected temperature value or a signal correlated/proportional to it.

In block P3, the control unit 9 performs the comparison between the temperature of the sanitary water detected by the temperature meter 77 and the reference temperature.

In the case in which the temperature of the sanitary water detected by the temperature meter 77 is greater than the reference temperature or equal to the reference temperature, block P4 is executed, in which the control unit 9 sends a control signal to the electric actuator 11 so as to place the flow regulator 8 to the opening degree corresponding to the flow rate of the sanitary water requested by the user (for example opening the valve to the maximum). The flow regulator 8 is therefore activated by the control unit 9 directly in the first operating mode (i.e. in the steady-state operating mode), the sanitary water being available in the delivery line 19 already at the temperature required by the user. Once the P4 block is completed, it returns to the P2 block for a new detection of the sanitary water temperature by means of the temperature meter 77. Advantageously, the blocks P2, P3 and P4 are performed iteratively.

If the temperature of the sanitary water detected by the temperature meter 77 is lower than the reference temperature, block P5 is executed, in which the presence of a sanitary water flow through the thermostatic device 25 is verified. For this verification, the control unit 9 can be conveniently used with the flow meter 3, being connected to the latter operatively.

In the block P6, the control unit 9 establishes whether in the delivery line 19 there is a substantial absence of sanitary water flow, or a substantial presence of sanitary water flow.

If there is a substantial absence of sanitary water flow through the thermostatic device 25, block P7 is executed, in which the control unit 9 sends a command signal to the electric actuator 11, so that the same electric actuator 11 carries out a controlled opening of the flow regulator 8. This controlled opening, which starts from the minimum opening degree of the flow regulator 8, is aimed at reaching the minimum flow condition $Q_{min}$ of sanitary water through the delivery line 19 to activate the generator 18. Once the block P7 has been completed, it is advantageously returned to the block P1 or P2 to first perform a new detection of the temperature of the sanitary water by means of the temperature meter 77 and then a new detection regarding the condition of absence or presence of flow through the delivery line 19.

In the case where there is instead a substantial presence of sanitary water flow through the thermostatic device 25, block P8 is executed, in which the control unit 9 sends a command signal to the electric actuator 11, so as to place the flow regulator 8 at the opening degree corresponding to the minimum flow rate $Q_{min}$ of sanitary water. Since in the delivery line 19 there is yet no sanitary water available at the temperature required by the user, the flow regulator 8 is therefore activated by the control unit 9 in the second operating mode, so as to avoid a significant waste of sanitary water and/or a significant waste of energy during the period necessary for the generator to increase the temperature of the sanitary water up to the temperature required by the user (i.e. up to the reference temperature). Once the block P8 has been completed, it is advantageously returned to the block P1 (or to the block P2) to repeat the adjustment method (and therefore to perform a new detection of the temperature of the sanitary water by means of the temperature meter 77, in order to check if the reference temperature has been reached). Also to be able to take into account any variations in the temperature and/or flow rate of sanitary water requested by the user, the blocks P1, P2, P3, P5, P6 and P8 are therefore executed iteratively, this iteration interrupting when the control unit 9, on the basis of the comparison of block P3, notices that the domestic water temperature is higher than the reference temperature or equal to the reference temperature, this condition determining the execution of block P4, in which the operating condition of the regulator 8 is switched from the second operating condition to the first operating condition. By means of this iteration, the adjustment method according to an embodiment ensures the permanence of the minimum flow rate $Q_{min}$ along the delivery line 19 until the reference temperature (and therefore an energy-efficient operation of the system) is reached.

The minimum flow rate of sanitary water along the delivery line 19 and/or equivalently the minimum opening degree of the flow regulator 8 are stored in the control unit 9, having been previously obtained through a suitable calibration method, which represents by itself an advantageous technical solution. The calibration method of the flow regulator 8 according to an embodiment, which can be performed by the control unit 9, comprises the steps of:

(A) placing the flow regulator 8 at its own minimum opening degree;

(B) detecting if along the pipeline on which the flow regulator 8 is installed there is a condition of substantial absence of flow as long as the presence of a sanitary water flow is not detected;

(C) increasing the opening degree of the flow regulator 8;

(D) as long as the condition of substantial absence of flow persists, execute steps B) and C) recursively; and (E) measuring and/or calculating the flow of sanitary water along said conduit when the presence of the flow of sanitary water is detected, this flow being identified as the minimum flow rate for said flow regulator.

It is worth noting that the term "substantial absence of flow" means the presence of a flow of sanitary water that is not sufficient to allow the thermal power generator to activate. The presence of a sanitary water flow is detected when the control unit determines that the temperature detected by the temperature meter has increased by a predetermined value with respect to the temperature detected at the beginning of the calibration procedure. In other words, at the beginning of the calibration procedure there is no flow of water, or if there is flow, there is no increase in temperature since the flow crossing the delivery line is such as not to allow the generator of thermal power to activate (i.e. the boiler to heat the water). When the minimum activation flow request is reached (i.e. this minimum activation flow), the generator starts to operate and the measured temperature of the water entering the device goes up; the control unit can therefore establish what the minimum activation capacity of the boiler is and store it for subsequent uses of the device itself. A delta temperature is set which must be checked to ensure that it is a question of boiler activation and not a temperature oscillation not due to the thermal power generator.

A further feature of the control unit 9 consists in keeping track of the number of domestic hot water supply requests made by the user. This in fact allows re-executing the calibration procedure every predetermined number of domestic water supply requests, for example to maintain a high degree of efficiency of the thermostatic device over time. The new values determined relative to the opening degree or flow rate to guarantee the flow of sanitary water, are therefore stored by the control unit as minimum values of the opening degree or minimum flow $Q_{min}$ of the flow regulator. In order to operate safely and in compliance with the regulations in force, the operation of the generator 18 is conditioned by the possibility of disposing of the heat released therein in adequate quantity by the sanitary water which is then conveyed to the delivery line 19. On the other hand, it is instead advantageous that the disposal of heat through the delivery line 19 is kept to a maximum when it is not possible or not appropriate or it is not comfortable to exploit such a heat. The calibration method according to an embodiment therefore aims to ensure that the generator 18 functions with minimum energy waste as long as the heat released by it cannot be used by the user.

From the foregoing, it follows that the value of the minimum flow rate through the delivery line 19 depends primarily on the features of the generator 18, and only secondarily on the features of the flow regulator 8. At the time of installation of the thermostatic device 25 along the delivery line 19, the situation that typically occurs is that in which the control unit 9 of this thermostatic device 25 does not know which is the type of generator 18 installed in the system nor what is the minimum flow rate through the delivery line 19 which allows the generator 18 to operate.

The calibration method according to an embodiment therefore allows the control unit 9, after the installation of the thermostatic device 25 in the system, to acquire the value of the minimum domestic hot water flow along the delivery line 19.

The control unit 9, for the minimum flow rate to be determined and/or stored along the pipeline on which the flow regulator 8 is installed, transmits, at the beginning of the calibration method, a command signal to the electric actuator 11 to arrange the flow regulator 8 to its minimum opening degree. Following this action on the flow regulator 8, the control unit 9 receives the signal acquired by the flow meter 3, in order to check whether there is a flow through the thermostatic device 25 when the flow rate of sanitary water along the delivery line 19 is the one corresponding to the minimum opening degree of the flow regulator 8. Alternatively and/or in combination with the flow meter 3, the control unit can query the temperature meter 77. In fact, if this temperature meter 77 perceives a substantial increase in temperature, this increase can only be due to the fact that the thermostatic device 25 is supplied with sanitary water coming from the generator 18 (and therefore to the fact that there is a flow along the delivery line 19).

If the flow meter 3 does not perceive any presence of flow and/or if the temperature meter 77 does not perceive any increase in the temperature of the sanitary water, the control unit 9 sends a command signal to the electric actuator 11 to progressively increase the opening degree of the flow regulator 8 (by varying the opening degree of the flow regulator 8 in a continuous or discrete manner). Following this action on the flow regulator 8, the control unit 9 again receives the signal acquired by the flow meter 3 and/or the signal acquired by the temperature meter 77. The steps for increasing the opening degree of the flow regulator 8 and subsequently acquiring a signal representative of a possible flow along the delivery line 19 are repeated iteratively until a flow of sanitary water is detected along the pipeline on which the flow regulator 8 is installed. At this point, the control unit 9 stops transmitting to the electric actuator 11 the command to increase the opening degree of the flow regulator 8. The control unit 9 then carries out a reading of the flow meter 3, in order to acquire from it the minimum flow rate value of the flow regulator 8 in the system in which it was installed. If the thermostatic device 25 is devoid of flow meters, the minimum flow rate value can in any case be calculated and/or derived, after storing in the control unit 9 the value of the passage section for each opening degree of the flow regulator 8 and knowledge of the ΔP straddling the regulator.

Profitably, the minimum flow rate value obtained as a result of the calibration procedure just described is stored in the control unit 9, in order to be then advantageously used in the subsequent adjustments of the water flow rate along the delivery line 19. It is also possible to calibrate the flow regulator 8 so as to obtain a plurality of minimum flow rate values, each of which corresponding to a specific temperature value of sanitary water requested by the user.

Since the control unit 9 is an electronic device and therefore having a processing and timing capacity, the thermostatic device 25 is able to calculate, starting from the measurements of the temperature meter 77 and/or of the flow meter 3, parameters representing the flow of sanitary water along the delivery line 19 and useful for managing the thermostatic device 25. By way of example, the control unit 9 can calculate the total volume of sanitary water supplied by the thermostatic device 25 at minimum flow, the total operating time of the thermostatic device 25 at minimum flow, the total volume of sanitary water supplied by the thermostatic device 25, the total supply of sanitary water by the thermostatic device 25 and the average volume (in the time unit) of sanitary water supplied by the thermostatic device 25.

Furthermore the thermostatic device 25 is further able to calculate, starting from the measurements of the temperature meter 77 and/or of the flow meter 3, parameters representative of the operation of the generator 18 and useful for the management of the generator 18, if the supply and/or dispensing system of sanitary water comprises a remote temperature meter 7 configured to detect the temperature of the sanitary water along the supply line 21 (hence the temperature of the sanitary water entering the generator 18) and if this remote temperature meter 7 is operatively connected to the control unit 9 of the thermostatic device 25. In this case, in fact, the control unit 9, being able to perform the comparison between the temperature of the sanitary water detected by the temperature meter 77 and the temperature of the sanitary water detected by the remote temperature meter 7, can calculate parameters such as the thermal power of the generator 18 and the thermal energy released by the generator 18.

Advantageously the control unit 9, due to its processing capabilities, can generate, starting from the measurements of the temperature meter 77 and/or the flow meter 3 and/or the remote temperature meter 7, statistical information and/or diagnostic information relating to the thermostatic device 25 and/or to the generator 18 and/or to the sanitary water supply and/or dispensing system. Only by way of example of such statistical and/or diagnostic information, it can be imagined that the control unit is able to define a profile representative of the usual use of the thermostatic device 25 and/or to identify an anomalous use of the thermostatic device 25 and/or to detect a possible failure or loss downstream of the thermostatic device 25.

The control unit 9 is also advantageously able to perform control procedures of the thermostatic device 25 which increase its safety and/or improve its performance and/or facilitate its maintenance operations. In an example of a safety procedure, given herein purely by way of a non-limiting example, the control unit 9 transmits to the electric actuator 11 the command to reduce the opening degree of the flow regulator 8 (in particular to zero, or to the minimum opening degree), in conjunction with parameters that denote an operation of the thermostatic device 25 and/or of the generator 18 and/or of the sanitary water supply and/or dispensing system considered unsafe or otherwise capable of causing damage to the system and/or to the user. This command to reduce the opening degree of the flow regulator 8 can be generated automatically by the control unit 9 when the temperature detected by the temperature meter 77 is higher than a predetermined temperature threshold (safety temperature) or when a possible fault or loss downstream of the thermostatic device 25 is detected by the control unit 9.

In particular, the thermostatic device 25 according to an embodiment comprises means suitable for making at least one information explicit, in particular a screen, or an acoustic alarm, these means being operatively connected to the control unit 9. For example, through the screen, the thermostatic device 25 can display the flow rate of the sanitary water detected by the flow meter 3 and/or the temperature of the sanitary water detected by the temperature meter 77. Through the acoustic alarm the thermostatic device 25 can signal to the user the occurrence of potentially dangerous operating conditions that led to the closure of the flow regulator 8 or the positive conclusion of the calibration procedure with the quantification of the minimum flow rate of sanitary water along the delivery line 19.

Considerable benefits can be obtained if the thermostatic device 25 has means for connecting to a communication network, operatively connected to the control unit 9. In particular, the communication network used by the thermostatic device 25 is a radio-frequency network, or a telephone network. This communication network, allowing the thermostatic device 25 to interface with further intelligent devices inside or outside the home environment in which the thermostatic device 25 is installed, allows the control unit 9 to receive further operating parameters of the system and to have additional calculation capabilities, as well as to be integrated into home automation systems, being able in this latter case to communicate directly with the control unit of the generator 18. Among the additional information that can be received by the thermostatic device 25 through the communication network, the energy tariff is of significant importance, on the basis of which the control unit 9 can estimate the energy cost on each activation of the generator 18 for supplying hot water to the delivery line 19. Among the additional features that can instead be conferred by the thermostatic device 25 due to its interfacing with a communication network, the setting to be remotely monitored and/or controlled by means of a portable device, such as a smartphone, on which a special application is installed, is noted.

The disclosed embodiments significantly limit the waste of water and energy of a domestic hot water supply system. The thermostatic device 25 is also energetically efficient, easy to install and to use and capable of providing the user with useful additional functions, being able to be integrated into adequately complex control systems. The system then allows carrying out measurements relating both to the operation of the thermostatic device 25 and to the operation of the generator 18, in particular by ensuring that the thermal power and the flow rate supplied are fully compliant with the efficient achievement of the delivery conditions through the utilities 23a, 23b, 23c desired by the user.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A thermostatic device for a duct of a sanitary water distribution and delivery system, the thermostatic device comprises:
   a temperature meter configured to detect a temperature of sanitary water entering, exiting or flowing through the thermostatic device,
   a flow regulator configured to regulate a flow of the sanitary water from said thermostatic device, and
   a control unit operatively connected to the temperature meter and to the flow regulator,
   wherein said flow regulator is arranged to operate according to a first operating mode and according to a second operating mode,
   wherein the first operating mode is a steady-state operating mode in which the flow of the sanitary water at the outlet of said thermostatic device is a steady-state flow rate, and
   wherein the second operating mode is an operating mode to reach a steady state in which the flow of sanitary water exiting from said thermostatic device is a reduced flow rate lower than said steady-state flow rate,
   wherein said control unit is configured to determine, by acquiring or calculating, a reference temperature and to arrange a switching of the operating mode of said flow regulator from said second operating mode to said first operating mode when a temperature of the sanitary water measured by said temperature meter is in a predetermined relationship to the reference temperature,
   wherein said control unit is further configured to perform a calibration procedure, including moving the flow regulator, to determine a set degree of opening of the flow regulator causing said reduced flow rate to exit from said thermostatic device,
   wherein the control unit, in executing said calibration procedure, is configured to:
   arrange said flow regulator to a prefixed degree of opening, wherein said prefixed degree of opening is in a range from a fully closed condition in which no water flows through the thermostatic device to a maximum water flow passage open condition in which a maximum water flow passes through the thermostatic device,
   if water flows through the thermostatic device while the flow regulator is at said prefixed degree of opening, decreasing a degree of opening of the flow regulator until no water flow passes through the thermostatic device and determining a set degree of opening of the flow regulator based on a degree of opening at which the water flow transitions from a flow of the sanitary water through the thermostatic device to an absence of water flow through the thermostatic device, wherein the degree of opening at a transition from the flow to the absence differs from a fully closed condition of the flow regulator; and
   if no water passes through the thermostatic device when the flow regulator is at said prefixed degree of opening, increasing the degree of opening of the flow regulator until a flow of sanitary water is detected through said thermostatic device and determining the set degree of opening of the flow regulator based on the degree of opening at which the flow transition between an absence of the sanitary water flow to the flow of the sanitary water, wherein the degree of opening causing a transition from the absence to the flow different differs from the fully closed condition of the flow regulator.

2. The thermostatic device according to claim 1, wherein the set degree of opening of the flow regulator is higher than the degree of opening of the flow regulator causing the switch, the set degree of opening of the flow regulator being higher by a percentage in a range of 1% to 25%.

3. The thermostatic device according to claim 1, further comprising a flow meter, configured to detect the flow of the sanitary water passing through said thermostatic device, said control unit being operatively connected to the flow meter, wherein said flow meter is used to detect the flow of sanitary water through said thermostatic device and said reduced flow rate corresponds to the flow rate measured by said flow meter in relation to the set degree of opening of the flow regulator.

4. The thermostatic device according to claim 1, wherein, during said calibration procedure, said temperature meter is used to detect the flow of sanitary water through said thermostatic device, said set opening degree being determined by the opening degree of said flow regulator at the moment in which a temperature variation occurs, detected by the temperature meter with respect to a temperature detected at the beginning of the calibration process in a predetermined time interval.

5. The thermostatic device according to claim 3, wherein in said first operating mode of said flow regulator, said control unit is arranged to use the flow rate detected by said flow meter as a control or feedback signal of the degree of opening of said flow regulator, said flow meter comprises a calibrated orifice and is sensitive to the pressure difference existing between a first region upstream of said calibrated orifice and a second region downstream of said calibrated orifice, the flow rate being determined as a function of the pressure difference detected.

6. The thermostatic device according to claim 1, wherein the control unit is configured for keeping track of the number of domestic hot water requests and at each predetermined number of domestic hot water requests, the control unit provides to repeat the calibration procedure, a new value determined relative to the opening degree or flow rate to guarantee the flow of sanitary water, being stored by the control unit as an updated set value of the opening degree or minimum flow of the flow regulator.

7. The thermostatic device according to claim 1, wherein said switching occurs by varying the degree of opening of said flow regulator according to a predetermined profile over time as a function of a difference between said measured sanitary water temperature and said reference temperature, the flow rate of sanitary water exiting from said thermostatic device increasing proportionally with respect to the temperature difference between the measured temperature and the reference temperature, upon reaching a steady-state temperature, the device dispensing the steady-state flow rate.

8. The thermostatic device according to claim 1, wherein in the switching between said second and first operating mode, a ratio between the variation relative to the temperature of the sanitary water and a corresponding variation in the flow rate is substantially constant in at least a portion of said predetermined profile.

9. The thermostatic device according to claim 1, wherein in the switching between said second and first operating mode, a ratio between a variation relative to the temperature of the sanitary water and a corresponding variation of flow rate is higher than 1 in at least a portion of said predetermined profile, defining an opening profile which defines a lower initial opening of the flow regulator to dispense less sanitary water before reaching the steady-state flow to increase energy efficiency.

10. The thermostatic device according to claim 1, wherein said control unit is configured to automatically bring said flow regulator to a closed condition in response to at least one of the following events:
the temperature detected by said temperature meter is higher than a predetermined temperature threshold, and
a fault or water loss is detected by said control unit.

11. The thermostatic device according to claim 1,
wherein the switching occurs by varying the opening degree of said flow regulator according to a predetermined profile over time depending on both the temperature of the sanitary water detected and the reference temperature.

12. The thermostatic device according to claim 11, wherein said switching occurs by varying the degree of opening of said flow regulator according to a predetermined profile over time as a function of a difference between said measured sanitary water temperature and said reference temperature.

13. The thermostatic device according to claim 12, wherein the flow rate of sanitary water exiting from said thermostatic device increasing proportionally with respect to the temperature difference between the measured temperature and the reference temperature, upon reaching a steady-state temperature, the device dispensing the steady-state flow rate.

14. The thermostatic device according to claim 11, wherein the reference temperature is a temperature below a steady state temperature of hot water leaving a boiler and the switching starts when the temperature of the detected sanitary water reaches the reference temperature, the switching occurring by varying the opening degree of said flow regulator according to a predetermined profile over time, the reduced flow rate lower than said flow rate at steady state of the second operating mode increases as the temperature of the detected sanitary water increases until reaching such a steady state flow rate.

15. The thermostatic device according to claim 11, wherein said control unit is further configured to perform a calibration procedure, including moving the flow regulator, to determine a set degree of opening of the flow regulator causing said reduced flow rate to exit from said thermostatic device,
wherein the control unit in executing said calibration procedure, is configured for:
arranging said flow regulator to a prefixed degree of opening, said prefixed degree of opening being anyone of the flow regulator configurations included between a fully closed condition in which no water flows through the thermostatic device and a maximum water flow passage open condition in which the maximum water flow passes through the thermostatic device, said flow regulator configurations also comprising the fully closed condition and the maximum water passage open condition;
wherein the control unit being further configured for:
in case a water flow passes through the thermostatic device when the flow regulator is at said prefixed degree of opening, decreasing the degree of opening of the flow regulator until no more water flow passes through the thermostatic device and determining the set degree of opening of the flow regulator based on the degree of opening causing the switch between water flow rate and absence of the water flow rate; and/or
in case no water passes through the thermostatic device when the flow regulator is at said prefixed degree of opening, increasing the degree of opening of the flow regulator until a flow of sanitary water is detected through said thermostatic device and determining the set degree of opening of the flow regulator based on the degree of opening causing the switch between absence of the water flow rate and presence of the water flow rate.

16. The thermostatic device of claim 1,
further comprising a flow meter configured to detect the flow of the sanitary water passing through said thermostatic device, said control unit being operatively connected to the flow meter to detect the flow of sanitary water through said thermostatic device,
wherein the switching occurs by varying the degree of opening of said flow regulator according to a predetermined profile over time as a function of the detected flow of sanitary water measured with said flow meter and the sanitary water temperature measured with said temperature meter.

17. The thermostatic device according to claim 16, wherein in said first operating mode of said flow regulator, said control unit is arranged to use the flow rate detected by said flow meter as a control or feedback signal of the degree of opening of said flow regulator, said flow meter comprises a calibrated orifice and is sensitive to the pressure difference existing between a first region upstream of said calibrated orifice and a second region downstream of said calibrated orifice, the flow rate being determined as a function of the detected pressure difference.

18. The thermostatic device according to claim 16, wherein said control unit is configured to automatically bring said flow regulator to a closed condition, in the event that:
the temperature detected by said temperature meter is higher than a predetermined temperature threshold, and/or
a fault or water loss is detected by said control unit.

19. The thermostatic device according to claim 16, wherein said control unit is further configured to perform a calibration procedure, including moving the flow regulator, to determine a set degree of opening of the flow regulator causing said reduced flow rate to exit from said thermostatic device,
wherein the control unit in executing said calibration procedure, is configured for:
arranging said flow regulator to a prefixed degree of opening, said prefixed degree of opening being anyone of the flow regulator configurations included between a fully closed condition in which no water flows through the thermostatic device and a maximum water flow passage open condition in which the maximum water flow passes through the thermostatic device, said flow regulator configurations also comprising the fully closed condition and the maximum water passage open condition;
the control unit being further configured for:
in case a water flow passes through the thermostatic device when the flow regulator is at said prefixed degree of opening, decreasing the degree of opening of the flow regulator until no more water flow passes through the thermostatic device and determining the set degree of opening of the flow regulator based on the degree of opening causing the switch between water flow rate and absence of the water flow rate; and/or in case no water passes through the thermostatic device when the flow regulator is at said prefixed degree of opening, increasing the degree of opening of the flow regulator until a flow of sanitary water is detected through said thermostatic device and determining the set degree of opening of the flow regulator based on the degree of opening causing the switch between absence of the water flow rate and presence of the water flow rate.

* * * * *